US011967255B2

(12) United States Patent
Friedman

(10) Patent No.: US 11,967,255 B2
(45) Date of Patent: Apr. 23, 2024

(54) PROTECTIVE TRADING CARD SLEEVE

(71) Applicant: Bryan Friedman, Chino, CA (US)

(72) Inventor: Bryan Friedman, Chino, CA (US)

( * ) Notice: Subject to any disclaimer, the term of this patent is extended or adjusted under 35 U.S.C. 154(b) by 0 days.

(21) Appl. No.: 17/204,633

(22) Filed: Mar. 17, 2021

(65) Prior Publication Data

US 2022/0301458 A1 Sep. 22, 2022

(51) Int. Cl.
*G09F 1/10* (2006.01)
*A45C 11/18* (2006.01)

(52) U.S. Cl.
CPC ................ *G09F 1/10* (2013.01); *A45C 11/18* (2013.01)

(58) Field of Classification Search
CPC .................................. G09F 1/10; A45C 11/18
USPC ............................ 206/449, 455; 40/537, 661
See application file for complete search history.

(56) References Cited

U.S. PATENT DOCUMENTS 3,443,093 A * 5/1969 Pierson .................. G03C 3/003 206/455
3,819,033 A * 6/1974 Hueber .................. A45C 11/04 206/5
3,958,690 A * 5/1976 Gee, Sr. .................. A61F 17/00 150/147
4,165,890 A * 8/1979 Leff ....................... B42D 15/00 283/46
4,473,153 A * 9/1984 Colangelo .......... G11B 33/0494 206/312
4,984,682 A * 1/1991 Cummins .............. A45C 11/04 206/5
5,080,223 A * 1/1992 Mitsuyama .......... A45C 11/182 150/147
5,159,964 A * 11/1992 Baker ....................... B42F 5/04 150/147
5,245,775 A * 9/1993 Goserud ................... G09F 1/10 40/776
5,259,136 A * 11/1993 Goserud ................... G09F 3/20 40/661
5,323,553 A 6/1994 Candido
5,377,733 A 1/1995 Halley et al.
6,282,826 B1 9/2001 Richards
11,065,530 B2 * 7/2021 Brown ...................... B44F 1/06
2004/0040194 A1 * 3/2004 Arraut ..................... G09F 3/207 40/661
2008/0000956 A1 1/2008 Collins (Continued)

OTHER PUBLICATIONS https://shop.ultrapro.com/products/81738?_pos=1&_sid=55e3ab96f&_ss=r.

https://www.ebay.com/i/173196411404?chn=ps&mkevt=1&mkcid=28.

*Primary Examiner* — Jacob K Ackun

(74) *Attorney, Agent, or Firm* — ROEDER & BRODER LLP; James P. Broder

(57) ABSTRACT

A protective trading card sleeve includes a substantially planar first wall and a substantially planar second wall. The first wall can have a plurality of edges including a first edge. The first edge of the first wall can be continuous and non-angular. The first edge of the first wall can have a first edge length. The substantially planar second wall can directly face the first wall and can have a substantially similar configuration as the first wall. The second wall can have a plurality of edges including a first edge that at least partially aligns with the first edge of the first wall. The first edge of the second wall can be continuous and non-angular. The first edge of the second wall can have a first edge length.

20 Claims, 4 Drawing Sheets

(56) References Cited

U.S. PATENT DOCUMENTS

| | | | | |
|---|---|---|---|---|
| 2008/0142518 | A1* | 6/2008 | Maistrellis | A45C 13/1069<br>281/31 |
| 2010/0115810 | A1 | 5/2010 | Morera | |
| 2010/0326865 | A1* | 12/2010 | Maistrellis | B42F 21/00<br>206/459.5 |
| 2020/0122019 | A1* | 4/2020 | Brown | A63F 1/02 |
| 2021/0308557 | A1* | 10/2021 | Baldocchi | A63F 1/10 |
| 2021/0322861 | A1* | 10/2021 | Brown | A63F 1/02 |

* cited by examiner

PROTECTIVE TRADING CARD SLEEVE

BACKGROUND

Trading cards of sports figures and other famous people have been admired, collected, traded, and sold for many decades. Standard trading cards are typically formed from paper or card stock and are subject to become frayed or otherwise damaged due to the relatively low durability of the formation materials. Despite the low cost of these materials, trading cards that are in perfect or near-perfect condition can be extremely valuable commodities on the marketplace and often resell for many times greater than the original retail price. Trading card owners often mail, ship, send, or otherwise protect their cards using a variety of specifically manufactured trading card accessories. Unfortunately, these accessories are configured such that it can be difficult to insert and remove the cards without causing harm or damage, particularly to the corners of the cards.

SUMMARY

The present invention is directed toward a protective trading card sleeve for retaining a trading card. The protective trading card sleeve includes a substantially planar first wall and a substantially planar second wall. The first wall can have a plurality of edges including a first edge. The first edge of the first wall can be continuous and non-angular. The first edge of the first wall can have a first edge length. The substantially planar second wall can directly face the first wall and can have a substantially similar configuration as the first wall. The second wall can have a plurality of edges including a first edge that at least partially aligns with the first edge of the first wall. The first edge of the second wall can be continuous and non-angular. The first edge of the second wall can have a first edge length. The first edge of the second wall can be connected to the first edge of the first wall along greater than 10% and less than 95% of at least one of the first edge lengths.

In some embodiments, the first edge of the first wall is at least partially curved.

In certain embodiments, the first edge of the second wall is at least partially curved.

In various embodiments, the first wall has a second edge that is continuous and non-angular, and the second wall has a second edge that is continuous and non-angular, each of the second edges having a second edge length. The second edge of the second wall is connected to the second edge of the first wall along greater than 10% and less than 95% of the second edge lengths.

In some embodiments, each of the first and second edges of the first wall are at least partially curved, and each of the first and second edges of the second wall are at least partially curved.

In certain embodiments, each of the first and second edges of the first wall are linear, and each of the first and second edges of the second wall are linear.

In various embodiments, only one of the first and second edges of the first wall and the first and second edges of the second wall are at least partially curved.

In some embodiments, only the first edge of the first wall is curved.

In certain embodiments, the first edge of the second wall is connected to the first edge of the first wall along greater than 10% and less than 95% of each of the first edge lengths.

In various embodiments, the first edge of the second wall is continuously connected to the first edge of the first wall along greater than 10% and less than 95% of at least one of the first edge lengths.

The present invention is also directed toward a protective trading card sleeve for retaining a trading card. The protective trading card sleeve includes a substantially planar first wall and a substantially planar second wall. The first wall can have a plurality of edges including a first edge. The first edge of the first wall can be continuous and non-angular. The first edge of the first wall can have a first edge length. The substantially planar second wall can directly face the first wall and can have a substantially similar configuration as the first wall. The second wall can have a plurality of edges including a first edge that at least partially aligns with the first edge of the first wall. The first edge of the second wall can be continuous and non-angular. The first edge of the second wall can have a first edge length. The first edge of the second wall can be connected to the first edge of the first wall along greater than 10% and less than 95% of the first edge lengths. The second wall can have a second edge that is adjacent to the first edge of the first wall. The first wall can have a second edge that is adjacent to the first edge of the second wall. The second wall can have a third edge that is adjacent to the first edge of the second wall and unconnected to the first edge of the first wall.

In some embodiments, the first edge of the first wall is at least partially curved.

In certain embodiments, the first edge of the second wall is at least partially curved.

In various embodiments, the first wall has a second edge that is continuous and non-angular, and the second wall has a second edge that is continuous and non-angular, each of the second edges having a second edge length, wherein the second edge of the second wall is connected to the second edge of the first wall along greater than 10% and less than 95% of the second edge lengths.

In some embodiments, each of the first and second edges of the first wall are at least partially curved, and each of the first and second edges of the second wall are at least partially curved.

In certain embodiments, each of the first and second edges of the first wall are linear, and each of the first and second edges of the second wall are linear.

In various embodiments, only one of the first and second edges of the first wall and the first and second edges of the second wall are at least partially curved.

In some embodiments, only the first edge of the first wall is curved.

In certain embodiments, the first edge of the second wall is continuously connected to the first edge of the first wall along greater than 10% and less than 95% of at least one of the first edge lengths.

The present invention is further directed toward a protective trading card sleeve for retaining a trading card. The protective trading card sleeve includes a substantially planar first wall and a substantially planar second wall. The first wall can have a plurality of edges including a first edge, a second edge, and a third edge. The first edge of the first wall can be continuous and non-angular. The first edge of the first wall can have a first edge length. The second edge of the first wall can be a top edge that is adjacent to the first edge of the first wall. The third edge of the first wall can be a bottom edge that is adjacent to the first edge of the first wall. The substantially planar second wall can directly face the first wall and can have a substantially similar configuration as the first wall. The second wall can have a plurality of edges including a first edge that at least partially aligns with the first edge of the first wall. The first edge of the second wall can be continuous and non-angular. The first edge of the second wall can have a first edge length, the first edge of the second wall can be connected to the first edge of the first wall along greater than 10% and less than 95% of the first edge lengths. The first edges of the first wall and the second wall can be side edges. The second wall can have a second edge that is a top edge that is adjacent to the first edge of the second wall and is unconnected to the second edge of the first wall. The second wall can have a third edge that is adjacent to the first edge of the second wall. The third edge of the second wall can be a bottom edge.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DESCRIPTION

Embodiments of the present invention are described herein in the context of protective trading card sleeves. Those of ordinary skill in the art will realize that the following detailed description of the present invention is illustrative only and is not intended to be in any way limiting. Other embodiments of the present invention will readily suggest themselves to such skilled persons having the benefit of this disclosure. Additionally, other methods of delivering energy to the lesion can be utilized, including, but not limited to, the electric current induced plasma generation. Reference will now be made in detail to implementations of the present invention as illustrated in the accompanying drawings.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related and business-related constraints, and that these specific goals will vary from one implementation to another and from one developer to another. Moreover, it is appreciated that such a development effort might be complex and time-consuming, but would nevertheless be a routine undertaking of engineering for those of ordinary skill in the art having the benefit of this disclosure.

Figure 1A:
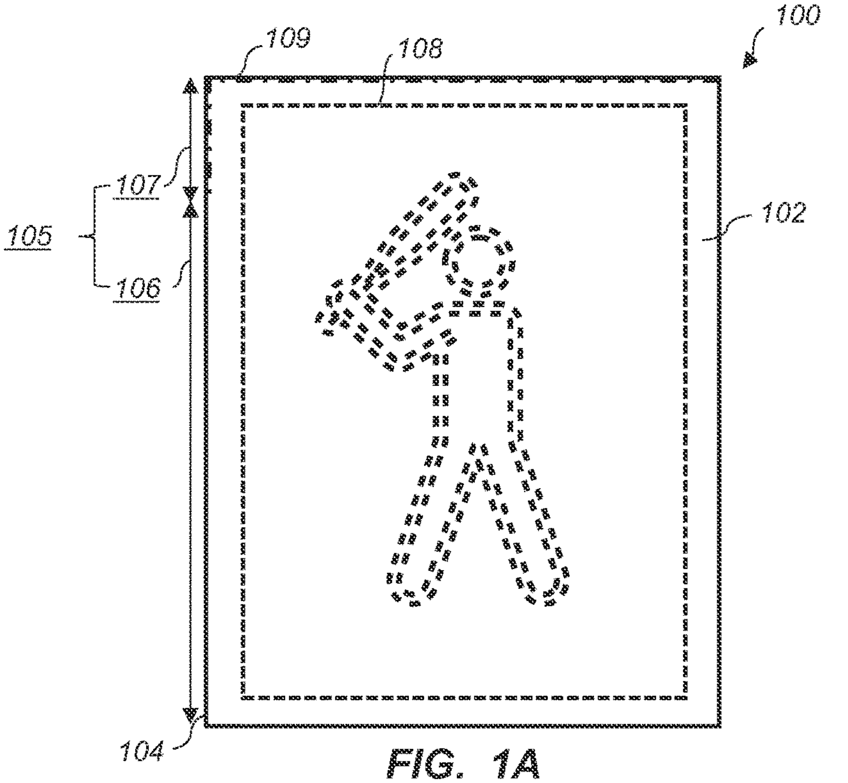
FIG. 1A is a simplified front view of a protective trading card sleeve having features of the present invention.

FIG. 1A is a simplified front view of a protective trading card sleeve 100. The protective trading card sleeve 100 protects, shields, and otherwise maintains the integrity of collectible goods (such as a trading card). In particular, the protective trading card sleeve 100 can protect the edges or corners of the collectible goods from being damaged upon insertion into the protective trading card sleeve 100. Additionally, the protective trading card sleeve 100 can protect the edges or corners of the collectible goods from being damaged upon removal from the protective trading card sleeve 100.

The size, shape, configuration, and design of the protective trading card sleeve 100 can vary depending on the design requirements. It is understood that the protective trading card sleeve 100 can include additional components, systems, subsystems, and elements than those specifically shown and/or described herein. Additionally, or alternatively, the protective trading card sleeve 100 can omit one or more of the components, systems, subsystems, and elements that are specifically shown and/or described herein.

In the embodiment depicted in FIG. 1A, the protective trading card sleeve 100 can include a first wall 102 including a first edge 104. The protective trading card sleeve 100 can be configured to receive a trading card and/or any other suitable collectible good that is compatible with the protective trading card sleeve 100.

The first wall 102 can be suitable for protecting the trading card from the outside elements. In some embodiments, the first wall 102 can be flexible. The size, shape, and design of the first wall 102 can vary depending on the design requirements of the first wall 102 and the protective trading card sleeve 100. The first wall 102 can be formed from any suitable materials including papers, plastics, metals, cardboard, adhesives, or any other suitable materials.

The walls (such as the first wall 102) of the protective trading card sleeve 100 can be formed from various materials and can include differing compositions. In certain embodiments, the walls can be formed from translucent materials. In various embodiments, the walls can be formed from plastic materials. Still alternatively, the walls can be formed from any other suitable material(s). The walls can be substantially planar. As provided in greater detail herein, the geometry, configuration, size, and/or shape of the walls of the protective trading card sleeve 100 can also be varied to suit the design requirements of the protective trading card sleeve 100.

The first edge 104 can be formed along the outer edge of the first wall 102. In the embodiment illustrated in FIG. 1A, the first wall 102 can have four edges. Alternatively, it is appreciated that the design of the protective trading card sleeve 100 and the first wall 102 can be made so that the first wall 102 can have any number of edges. The first edge 104 can be substantially parallel to other surface edges of the protective trading card sleeve 100. The first edge 104 can be substantially perpendicular to the other edges of the protective trading card sleeve 100. In some embodiments, the first edge 104 can be movable so that the protective trading card sleeve 100 can be opened to receive and retain the trading card 108.

Figure 1B:
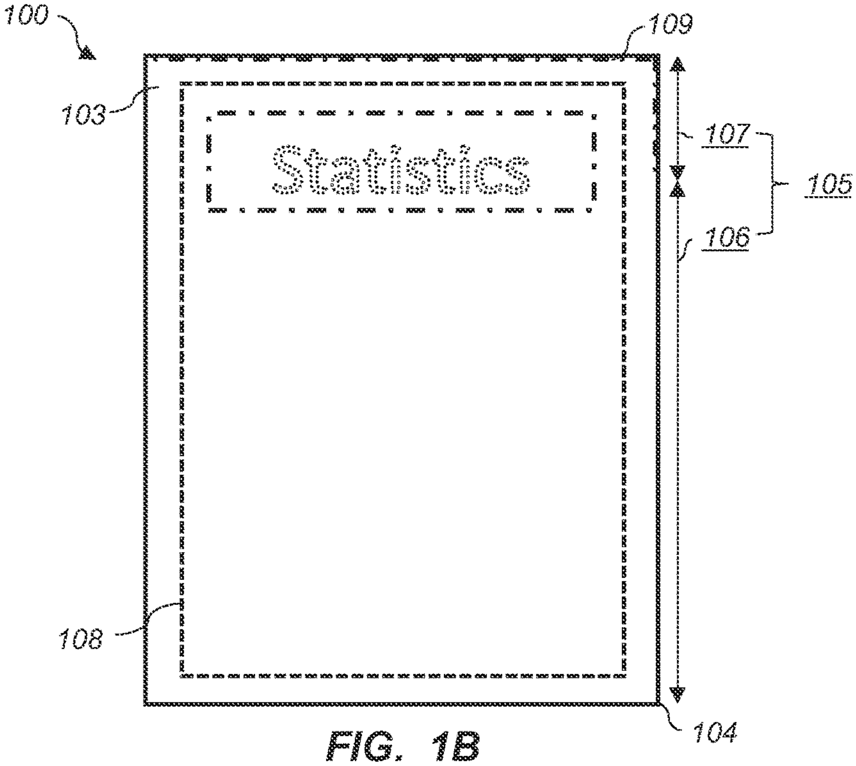
FIG. 1B is a simplified back view of the protective trading card sleeve illustrated in FIG. 1A.

FIG. 1B is a simplified back view of the protective trading card sleeve 100 depicted in FIG. 1A. In the embodiment depicted in FIG. 1B, the protective trading card sleeve 100 can include a second wall 103 including a first edge 104. The first edge 104 can have a first edge length 105. The first edge length 105 can include a connected portion length 106 and an unconnected portion length 107. The connected portion length 106 can indicate the length of the first edge 104 of the first wall 102 that is connected to the corresponding length of the first edge 104 of the second wall 103.

In some embodiments, the first edge 104 of the second wall 103 can be connected to the first edge 104 of the first wall 102 along greater than 10% and less than 95% of the first edge lengths 105 (as indicated by the connected portion length 106). In various embodiments, the first edge 104 of the second wall 103 can be connected to the first edge 104 of the first wall 102 along less than 10%. In certain embodiments, the first edge 104 of the second wall 103 can be connected to the first edge 104 of the first wall 102 along greater than 95% of the first edge lengths 105 (as indicated by the connected portion length 106).

It is appreciated that the percentage of connection between the first edge 104 of the first wall 102 and the first edge 104 of the second wall 103 can vary. In some embodiments, the connection between the first wall and can be greater than or equal to 1%, 5%, 10%, 20%, 30%, 40%, 50%, 60%, 70%, 80%, 90%, 100%. It is appreciated that the connection illustrated and/or described herein can have percentages that can fall within a range, wherein any of the foregoing numbers can serve as the lower or upper bound of the range, provided that the lower bound of the range is a value less than the upper bound of the range. The connection between the first edge 104 of the first wall 102 and the first edge 104 of the second wall 103 described herein can have percentages that fall outside of the range described herein.

The trading card 108 can be inserted and removed from the protective trading card sleeve 100 without damage to the corners, edges, and/or surfaces of the trading card 108. It is appreciated that the trading card 108 is representative of any kind of collectible item, including but not limited to, plaques, jerseys, game-memorabilia, etc. The protective trading card sleeve 100 can be adapted and configured to protect any kind of collectible item. The protective trading card sleeve 100 can be adapted to accommodate any size trading card 108. In some embodiments, the protective trading card sleeve 100 is designed to receive and retain a standard form factor trading card.

The slit 109 can designate an unconnected portion (e.g., the unconnected portion length 107) of the protective trading card sleeve 100. In other embodiments, the slit 109 can be cut into any portion of the protective trading card sleeve 100. In certain embodiments, the slit 109 is cut into the first wall 102 near the first edge 104. The slit 109 can be configured to allow components of the protective trading card sleeve 100, such as the first wall 102, to have additional flexibility and a greater range of motion and/or separation from the other components of the protective trading card sleeve 100. The size, shape, and design of the slit 109 can vary depending on the design requirements of the protective trading card sleeve 100, the first wall 102, and/or other components of the protective trading card sleeve 100.

Figure 2A:
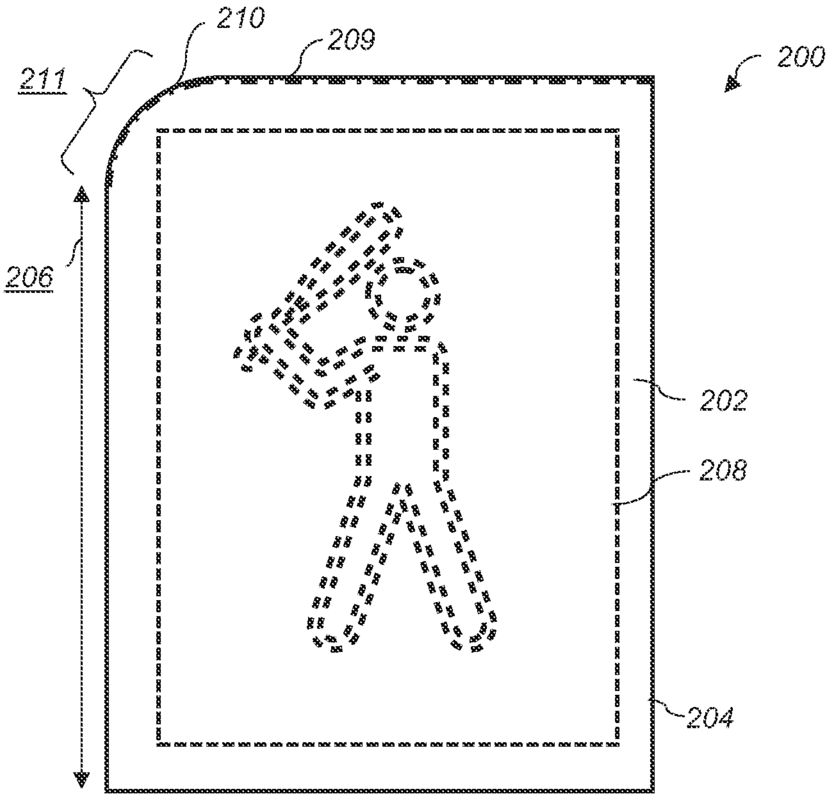
FIG. 2A is a simplified front view of another embodiment of the protective trading card sleeve.

FIG. 2A is a simplified front view of another embodiment of the protective trading card sleeve 200. In the embodiment illustrated in FIG. 2A, the protective trading card sleeve 200 has been simplified and can include one or more walls. The size, shape, configuration, and design of the protective trading card sleeve 200 can vary. The protective trading card sleeve 200 can include a first wall 202 and a second wall 203.

The first wall 202 can include a second edge and a third edge. The second edge of the first wall 202 can be a top edge that is adjacent to the first edge 204 of the first wall 202. The third edge of the first wall 202 can be a bottom edge that is adjacent to the first edge 204 of the first wall. The third edge of the first wall 202 can be unconnected to the third edge of the second wall 203

The second wall 203 can be attached and/or removably adhered to the first wall 202 to form the protective trading card sleeve 200. The second wall 203 can be suitable for protecting the trading card 208 from the outside elements. In some embodiments, the second wall 203 can be flexible. In other embodiments, the second wall 203 can remain static while the first wall 202 is movable in a direction away from the second wall 203.

The size, shape, and design of the second wall 203 can vary depending on the design requirements of the first wall 202 and the protective trading card sleeve 200. The second wall 203 can be formed from suitable materials including papers, plastics, metals, cardboard, adhesives, or any other suitable materials. Additionally, the first wall 202 and the second wall 203 can be substantially similar to the walls previously shown and described herein and/or shown in greater detail below.

The second wall 203 can include one or more edges (e.g., the first edge 204). One or more edges can be fully connected to one or more corresponding edges (e.g., the first wall 202 can be fully connected to the second wall 203 at any particular edge). In some embodiments, the first edge 204 of the first wall 202 can be connected to the first edge 204 of the second wall 203 so that there is a 10% to 98% connection between the first edge 204 of the first wall 202 the first edge 204 of the second wall 203 (e.g., along the connected portion length 206). The first wall 202 and the second wall 203 can also each include a curved edge 210.

The curved edge 210 can increase the flexibility of the protective trading card sleeve 200. The curved edge 210 can be continuous and non-angular. The curved edge 210 can be configured to receive the corners of the trading card 208. The curved edge 210 can be formed so that a portion of the trading card 208 is exposed so that a user can easily remove the trading card 208 by grasping the exposed portion (e.g., a corner) of the trading card 208. The curved edge 210 can have a curved edge length 211. The curved edge 210 of the first wall 202 can be connected or unconnected to the curved edge 210 of the second wall 203 along the curved edge length 211.

Figure 2B:
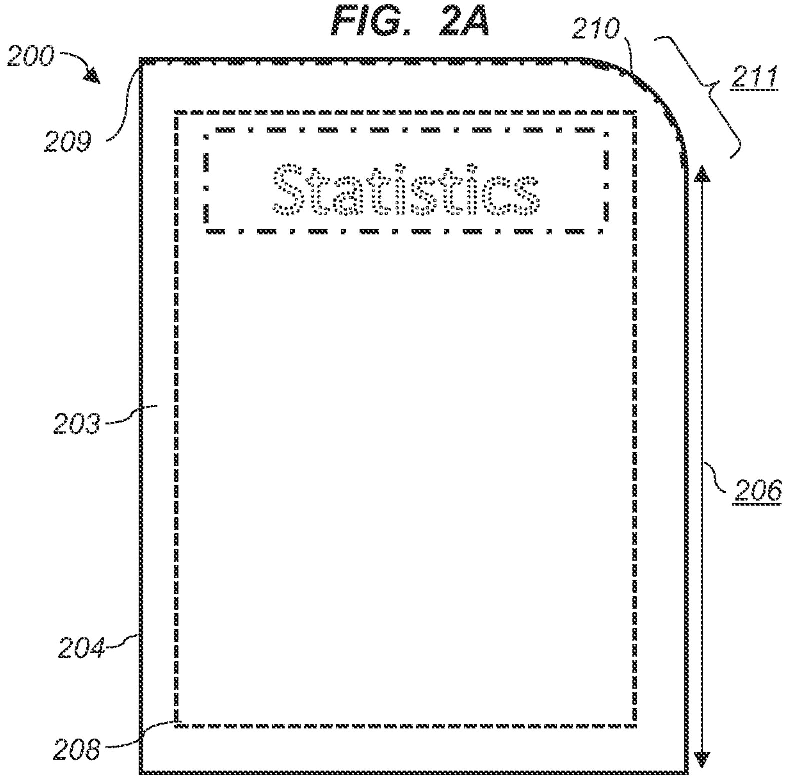
FIG. 2B is a simplified back view of the protective trading card sleeve illustrated in FIG. 2A.

FIG. 2B is a simplified back view of the protective trading card sleeve 200 depicted in FIG. 2A. As depicted in FIG. 2B, the slit 209 can indicate an unattached portion of the protective trading card sleeve 200. In certain embodiments, the top edge (e.g., the edge adjacent to the first edge 204) can be unattached and the curved edge 210 can also be unattached. With this design, a user can open the protective trading card sleeve 200 by manipulating the unattached curved edge 210. Utilizing this design can afford the trading card 208 additional spatial clearance upon entrance and exit of the trading card sleeve 200.

Figure 3:
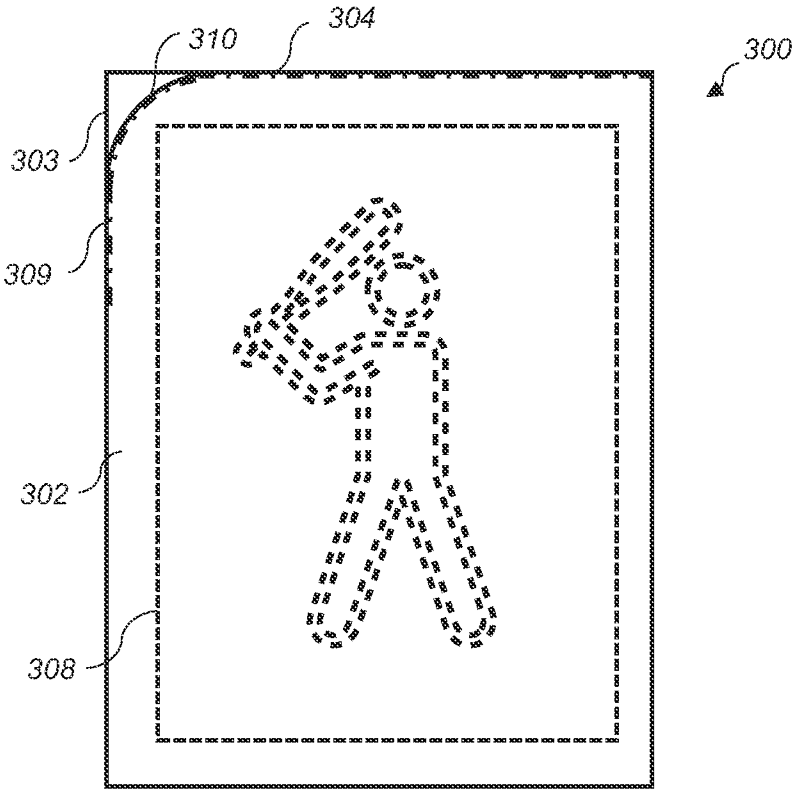
FIG. 3 is a simplified front view of another embodiment of the protective trading card sleeve.

FIG. 3 is a simplified front view of another embodiment of the protective trading card sleeve 300. In the embodiment illustrated in FIG. 3, the trading card sleeve 300 can include a first wall 302 (including a first edge 304) a second wall 303, a slit 309, and a curved surface edge 310. The protective trading card sleeve 300 of the embodiment shown in FIG. 3 can have substantially similar functionality and components to the other embodiments of the protective trading card sleeve 300 previously shown and described herein and/or shown and described in greater detail below.

In the embodiment depicted in FIG. 3, the first wall 302 can be movable while the second wall 303 remains static. A user can peel back the first wall 302 to allow the entry of a trading card 308 without damage and/or contact to the corners of the trading card 308. The second wall 303 can be made of a thicker material than the first wall 302, in order to provide greater protection to the rear of the trading card 308. By utilizing the embodiment depicted in FIG. 3, the trading card 308 can also be positioned within the protective trading card sleeve 300 so that a corner of the trading card 308 is exposed in the front while the corner is protected on the rear side.

Figure 4:
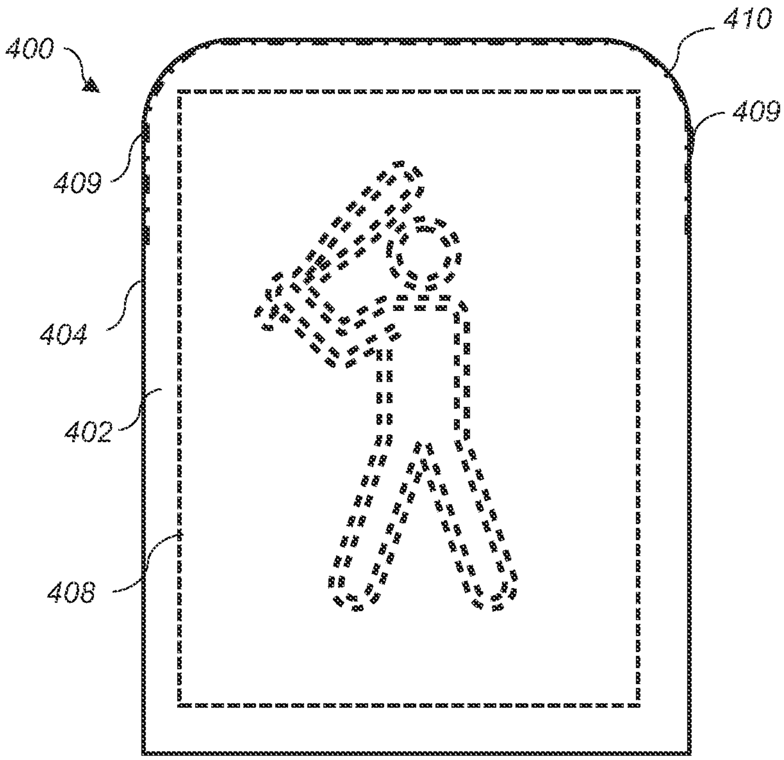
FIG. 4 is a simplified front view of yet another embodiment of the protective trading card sleeve.

FIG. 4 is a simplified front view of another embodiment of the protective trading card sleeve 400. In the embodiment illustrated in FIG. 4, the trading card sleeve 400 can include a first wall 402 (including a first edge 404), three or more slits 409, and two or more curved surface edges 410. The protective trading card sleeve 400 of the embodiment shown in FIG. 4 can have substantially similar functionality and components to the other embodiments of the protective trading card sleeve 400 previously shown and described herein and/or shown in greater detail below. By utilizing the embodiment depicted in FIG. 4, the trading card 408 can also be positioned within the protective trading card sleeve 400 so that two corners of the trading card 408 are exposed.

Figure 5:
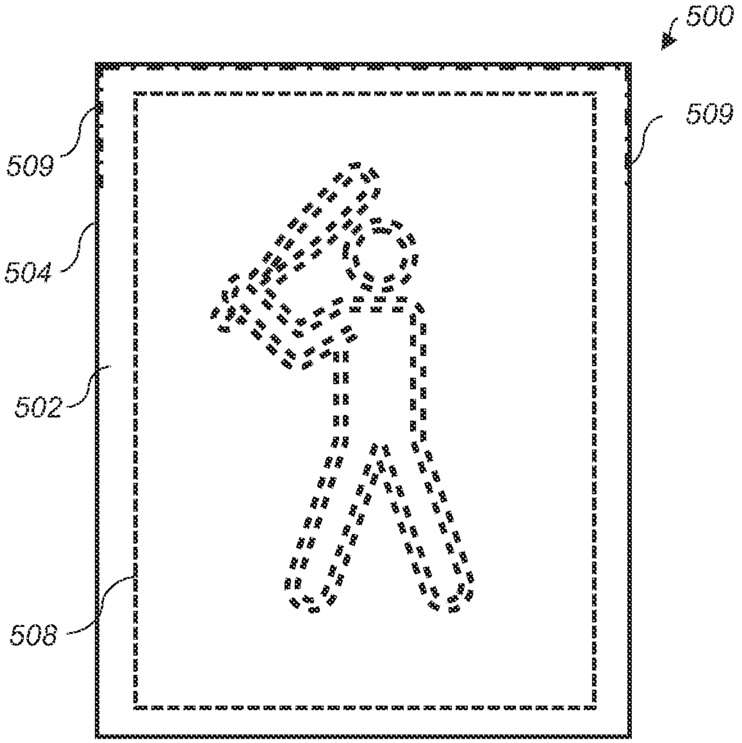
FIG. 5 is a simplified front view of still another embodiment of the protective trading card sleeve.

FIG. 5 is a simplified front view of another embodiment of the protective trading card sleeve 500. The protective trading card sleeve 500 can be configured to protect and retain the trading card 508. In the embodiment illustrated in FIG. 5, the trading card sleeve 500 can include a first wall 502 (including a first edge 504) and three or more slits 509. The protective trading card sleeve 500 of the embodiment shown in FIG. 5 can have substantially similar functionality and components to the other embodiments of the protective trading card sleeve 500 previously shown and described herein and/or shown in greater detail below.

It should be noted that, as used in this specification and the appended claims, the singular forms "a," "an," and "the" include plural referents unless the content and/or context clearly dictates otherwise. It should also be noted that the term "or" is generally employed in its sense including "and/or" unless the content or context clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

As used herein, the recitation of numerical ranges by endpoints shall include all numbers subsumed within that range, inclusive (e.g., 2 to 8 includes 2, 2.1, 2.8, 5.3, 7, 8, etc.).

It is recognized that the figures shown and described are not necessarily drawn to scale, and that they are provided for ease of reference and understanding, and for relative positioning of the structures.

The headings used herein are provided for consistency with suggestions under 37 CFR 1.77 or otherwise to provide organizational cues. These headings shall not be viewed to limit or characterize the invention(s) set out in any claims that may issue from this disclosure. As an example, a description of a technology in the "Background" is not an admission that technology is prior art to any invention(s) in this disclosure. Neither is the "Summary" or "Abstract" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

It is understood that although a number of different embodiments of the catheter systems have been illustrated and described herein, one or more features of any one embodiment can be combined with one or more features of one or more of the other embodiments, provided that such combination satisfies the intent of the present invention.

While a number of exemplary aspects and embodiments of the catheter systems have been discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope, and no limitations are intended to the details of construction or design herein shown.

What is claimed is:

1. A protective trading card sleeve for retaining a trading card, the protective trading card sleeve comprising:

a substantially rectangular and planar first wall, the first wall having a first edge having a first edge length, a second edge having a second edge length, a third edge having a third edge length, and a fourth edge having a fourth edge length; and a substantially rectangular and planar second wall that directly faces the first wall, the second wall having a substantially similar size as the first wall, the second wall having (i) a first edge that at least partially aligns with the first edge of the first wall, the first edge of the second wall having a first edge length, the first edge of the second wall being continuously connected to the first edge of the first wall along greater than 50% and less than 95% of the first edge lengths, (ii) a second edge that is adjacent to the second edge of the first wall, the second edge of the second wall having a second edge length, the second edge of the second wall being unconnected to the second edge of the first wall along the second edge lengths, (iii) a third edge that is adjacent to the third edge of the first wall, the third edge of the second wall having a third edge length, the third edge of the second wall being fully connected to the third edge of the first wall along the third edge lengths, and (iv) a fourth edge that is adjacent to the fourth edge of the first wall, the fourth edge of the second wall having a fourth edge length, the fourth edge of the second wall being fully connected to the fourth edge of the first wall along the fourth edge lengths.

2. The protective trading card sleeve of claim 1 wherein the first edge of the first wall is at least partially curved.

3. The protective trading card sleeve of claim 1 wherein the second edges are continuous and non-angular.

4. The protective trading card sleeve of claim 3 wherein each of the first and second edges of the first wall are at least partially curved, and each of the first and second edges of the second wall are at least partially curved.

5. The protective trading card sleeve of claim 3 wherein each of the first and second edges of the first wall are linear, and each of the first and second edges of the second wall are linear.

6. The protective trading card sleeve of claim 3 wherein only one of the first and second edges of the first wall and the first and second edges of the second wall are at least partially curved.

7. The protective trading card sleeve of claim 1 wherein the first edge of the second wall is connected to the first edge of the first wall along greater than 60% and less than 95% of the first edge lengths.

8. The protective trading card sleeve of claim 1 wherein the first edge of the second wall is continuously connected to the first edge of the first wall along greater than 70% and less than 90% of at least one of the first edge lengths.

9. The protective trading card sleeve of claim 1 wherein the first edge of the second wall is continuously connected to the first edge of the first wall along greater than 80% and less than 90% of at least one of the first edge lengths.

10. A protective trading card sleeve for retaining a trading card, the protective trading card sleeve comprising:

a substantially planar first wall, the first wall having a a first edge having a first edge length, a second edge having a second edge length, a third edge having a third edge length, and a fourth edge having a fourth edge length; and a substantially planar second wall that directly faces the first wall, the second wall having a substantially similar size as the first wall, the second wall having (i) a first edge that at least partially aligns with the first edge of the first wall, the first edge of the second wall having a first edge length, the first edge of the second wall being connected to the first edge of the first wall along greater than 50% and less than 95% of the first edge lengths, (ii) a second edge that is adjacent to the second edge of the first wall, the second edge of the second wall having a second edge length, the second edge of the second wall being unconnected to the second edge of the first wall along the second edge lengths, (iii) a third edge that is adjacent to the third edge of the first wall, the third edge of the second wall having a third edge length, the third edge of the second wall being fully connected to the third edge of the first wall along the third edge lengths, and (iv) a fourth edge that is adjacent to the fourth edge of the first wall, the fourth edge of the second wall having a fourth edge length, the fourth edge of the second wall being fully connected to the fourth edge of the first wall along the fourth edge lengths.

11. The protective trading card sleeve of claim 10 wherein the first edge of the first wall is at least partially curved.

12. The protective trading card sleeve of claim 10 wherein the second edges are continuous and non-angular.

13. The protective trading card sleeve of claim 12 wherein each of the first and second edges of the first wall are at least partially curved, and each of the first and second edges of the second wall are at least partially curved.

14. The protective trading card sleeve of claim 12 wherein each of the first and second edges of the first wall are linear, and each of the first and second edges of the second wall are linear.

15. The protective trading card sleeve of claim 12 wherein only one of the first and second edges of the first wall and the first and second edges of the second wall are at least partially curved.

16. The protective trading card sleeve of claim 10 wherein the first edge of the second wall is continuously connected to the first edge of the first wall along greater than 60% and less than 95% of at least one of the first edge lengths.

17. The protective trading card sleeve of claim 10 wherein the first edge of the second wall is continuously connected to the first edge of the first wall along greater than 70% and less than 90% of at least one of the first edge lengths.

18. The protective trading card sleeve of claim 10 wherein the first edge of the second wall is continuously connected to the first edge of the first wall along greater than 80% and less than 90% of at least one of the first edge lengths.

19. A protective trading card sleeve for retaining a trading card, the protective trading card sleeve comprising:

a substantially planar first wall, the first wall having a first edge, a second edge, a third edge, and a fourth edge, the first edge of the first wall having a first edge length, the second edge of the first wall being a top edge that is substantially perpendicular to the first edge of the first wall, the third edge of the first wall being a bottom edge that is substantially perpendicular to the first edge of the first wall, the fourth edge of the first wall being substantially perpendicular to the second edge and third edge of the first wall; and a substantially planar second wall that directly faces the first wall, the second wall having a substantially similar shape and size as the first wall, the second wall having (i) a first edge that at least partially aligns with the first edge of the first wall, the first edge of the second wall having a first edge length, the first edge of the second wall being continuously connected to the first edge of the first wall along greater than 50% and less than 95% of the first edge lengths, the first edge of the first wall and the first edge of the second wall being side edges, (ii) a second edge that is a top edge that is substantially perpendicular to the first edge of the second wall and is unconnected to the second edge of the first wall, (iii) a third edge that is substantially perpendicular to the first edge of the second wall, the third edge of the second wall being a bottom edge, the third edge of the second wall being fully connected to the third edge of the first wall, and (iv) a fourth edge that is adjacent to the fourth edge of the first wall, the fourth edge of the second wall being fully connected to the fourth edge of the first wall.

20. The protective trading card sleeve of claim 19 wherein the first edge of the second wall is continuously connected to the first edge of the first wall along greater than 80% and less than 90% of at least one of the first edge lengths.

* * * * *